United States Patent
Hagen

(10) Patent No.: US 10,760,690 B2
(45) Date of Patent: Sep. 1, 2020

(54) SEAL ASSEMBLY FOR A VALVE CLOSURE ELEMENT

(71) Applicant: Aktiebolaget SKF, Göteborg (SE)

(72) Inventor: Anthony Todd Hagen, Sandy, UT (US)

(73) Assignee: AKTIEBOLAGET SKF, Gothenburg (SE)

( * ) Notice: Subject to any disclaimer, the term of this patent is extended or adjusted under 35 U.S.C. 154(b) by 40 days.

(21) Appl. No.: 15/994,668

(22) Filed: May 31, 2018

(65) Prior Publication Data

US 2019/0368616 A1    Dec. 5, 2019

(51) Int. Cl.

| | |
|---|---|
| F16K 1/36 | (2006.01) |
| F16K 1/30 | (2006.01) |
| F16J 15/3264 | (2016.01) |
| F16K 31/163 | (2006.01) |
| F16K 3/314 | (2006.01) |

(52) U.S. Cl.
CPC .......... *F16K 1/306* (2013.01); *F16J 15/3264* (2013.01); *F16K 3/314* (2013.01); *F16K 31/163* (2013.01); *F16K 1/36* (2013.01)

(58) Field of Classification Search
CPC ........ F16K 1/306; F16K 3/314; F16K 31/163; F16K 1/46; F16K 1/36; F16J 15/3252; F16J 15/3276; F16J 15/3264
USPC ........................................ 251/215, 332, 330
See application file for complete search history.

(56) References Cited

U.S. PATENT DOCUMENTS

| | | | | |
|---|---|---|---|---|
| 4,356,996 A | * | 11/1982 | Linder | F16K 15/18 137/533.17 |
| 4,518,329 A | * | 5/1985 | Weaver | F04B 53/1027 137/516.25 |
| 4,750,709 A | * | 6/1988 | Kolenc | F16K 41/12 137/556 |
| 5,088,521 A | * | 2/1992 | Johnson | E21B 21/01 137/516.29 |

* cited by examiner

*Primary Examiner* — Kelsey E Cary
(74) *Attorney, Agent, or Firm* — J-Tek Law PLLC; Scott T. Wakeman; Mark A. Ussai

(57) ABSTRACT

A seal assembly is for a closure element of a valve assembly including a valve body with a flow passage and an annular seat extending about the passage, the closure element being linearly displaceable along a central axis and including a cylindrical body. The seal assembly includes an outer seal including an annular body formed of a polymeric material and having a centerline, an inner circumferential surface defining a seal bore, an outer circumferential surface, and opposing first and second axial ends, the first axial end having a generally radially-extending, annular sealing surface sealingly engageable with the valve seat. An inner connector includes a generally annular body formed of a substantially rigid material and disposed at least partially within the seal bore, the connector body having an inner circumferential surface frictionally engageable with the valve body outer surface to couple the seal with the closure element.

15 Claims, 10 Drawing Sheets

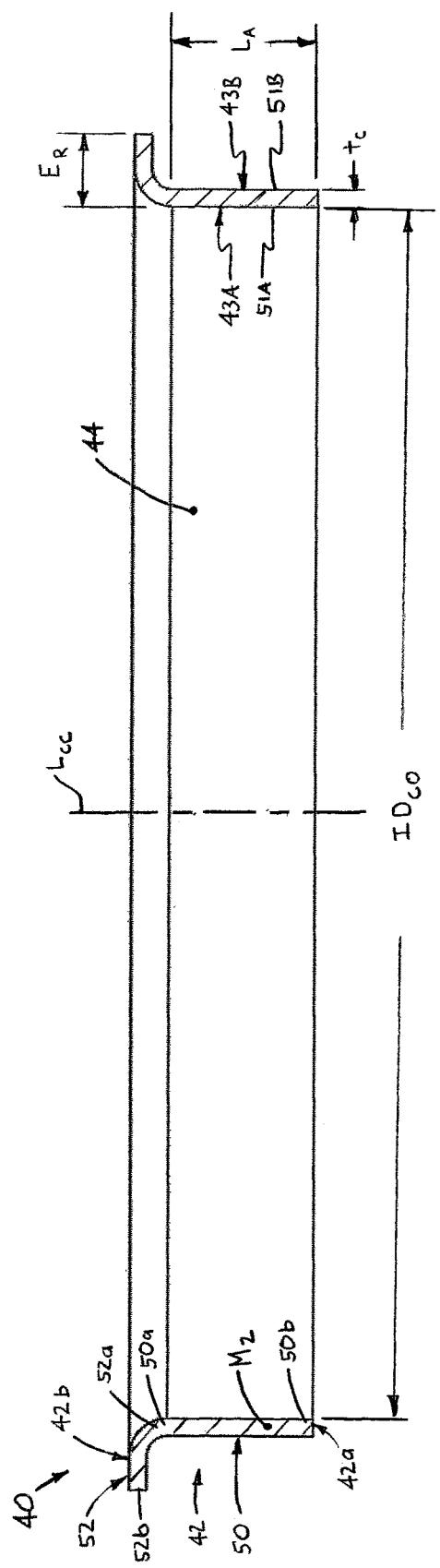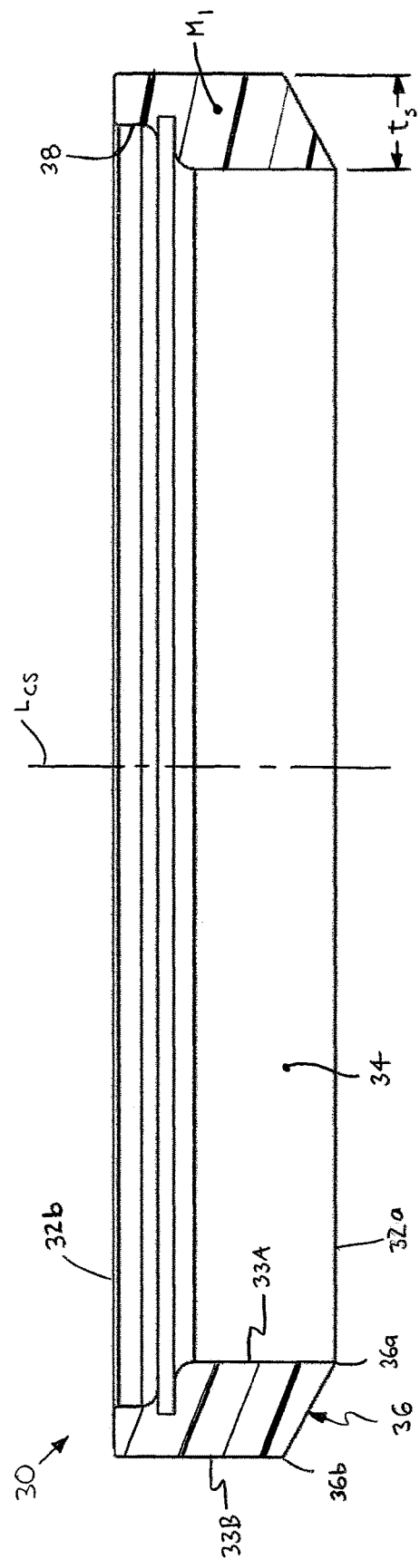

US 10,760,690 B2

SEAL ASSEMBLY FOR A VALVE CLOSURE ELEMENT

BACKGROUND OF THE INVENTION

The present invention relates to seals, and more particularly to seals for valve closure elements.

Seals for valve closure elements, such as used in valve assemblies of linear pumps, typically include an annular seal body formed of a polymeric material. In certain applications, the polymeric seal is retained on the metallic closure element by a snap or press-fit of the seal about the metallic element, which may fail due to separation of the seal from the closure element. In other applications, the seal is bonded to or injection molded about the closure element, which can be costly to fabricate or rework when the closure element is relatively large.

SUMMARY OF THE INVENTION

In one aspect, the present invention is a seal assembly for a closure element of a valve assembly including a valve body with a flow passage and a generally annular seat extending about the passage. The closure element is linearly displaceable along a central axis and includes a generally cylindrical body having an outer circumferential surface, a first axial end disposeable against the seat to interrupt flow from the passage and a second opposing axial end. The seal assembly comprises an outer seal including a generally annular body formed of a polymeric material and having a centerline, an inner circumferential surface defining a seal bore, an outer circumferential surface, and opposing first and second axial ends. The first axial end has a generally radially-extending, annular sealing surface sealingly engageable with the valve seat. An inner connector includes a generally annular body formed of a substantially rigid material and is disposed at least partially within the seal bore. The connector body has an inner circumferential surface frictionally engageable with the valve body outer surface to couple the seal with the closure element.

In another aspect, the present invention is a valve assembly comprising a valve body having a central flow passage and a generally annular valve seat extending circumferentially about the central passage. A closure element is linearly displaceable along a central axis and includes a generally cylindrical body having an outer circumferential surface, a first axial end disposeable against the seat to interrupt flow from the passage and a second opposing axial end. A seal assembly includes an outer seal including a generally annular body formed of a polymeric material and having a centerline, an inner circumferential surface defining a seal bore, an outer circumferential surface, and opposing first and second axial ends. The first axial end has a generally radially-extending, annular sealing surface sealingly engageable with the valve seat. Further, an inner connector includes a generally annular body formed of a substantially rigid material and disposed at least partially within the seal bore, the connector body having an inner circumferential surface frictionally engageable with the valve body outer surface to couple the seal with the closure element.

BRIEF DESCRIPTION OF THE SEVERAL VIEWS OF THE DRAWINGS

The foregoing summary, as well as the detailed description of the preferred embodiments of the present invention, will be better understood when read in conjunction with the appended drawings. For the purpose of illustrating the invention, there are shown in the drawings, which are diagrammatic, embodiments that are presently preferred. It should be understood, however, that the present invention is not limited to the precise arrangements and instrumentalities shown. In the drawings:

FIG. 2, are each an axial cross-sectional view of a valve assembly having the seal assembly of the present invention, shown in a closed position and an open position, respectively;

FIG. 8 is cross-sectional view of a connector of the seal assembly;

FIG. 9 is a cross-sectional view of a seal member of the seal assembly;

FIG. 11, are each a broken-away, cross-sectional view of the seal assembly with an alternative construction of the connector or/and the seal member.

DETAILED DESCRIPTION OF THE INVENTION

Certain terminology is used in the following description for convenience only and is not limiting. The words "inner", "inwardly" and "outer", "outwardly" refer to directions toward and away from, respectively, a designated centerline or a geometric center of an element being described, the particular meaning being readily apparent from the context of the description. Further, as used herein, the words "connected" and "coupled" are each intended to include direct connections between two members without any other members interposed therebetween and indirect connections between members in which one or more other members are interposed therebetween. The terminology includes the words specifically mentioned above, derivatives thereof, and words of similar import.

Figure 1:
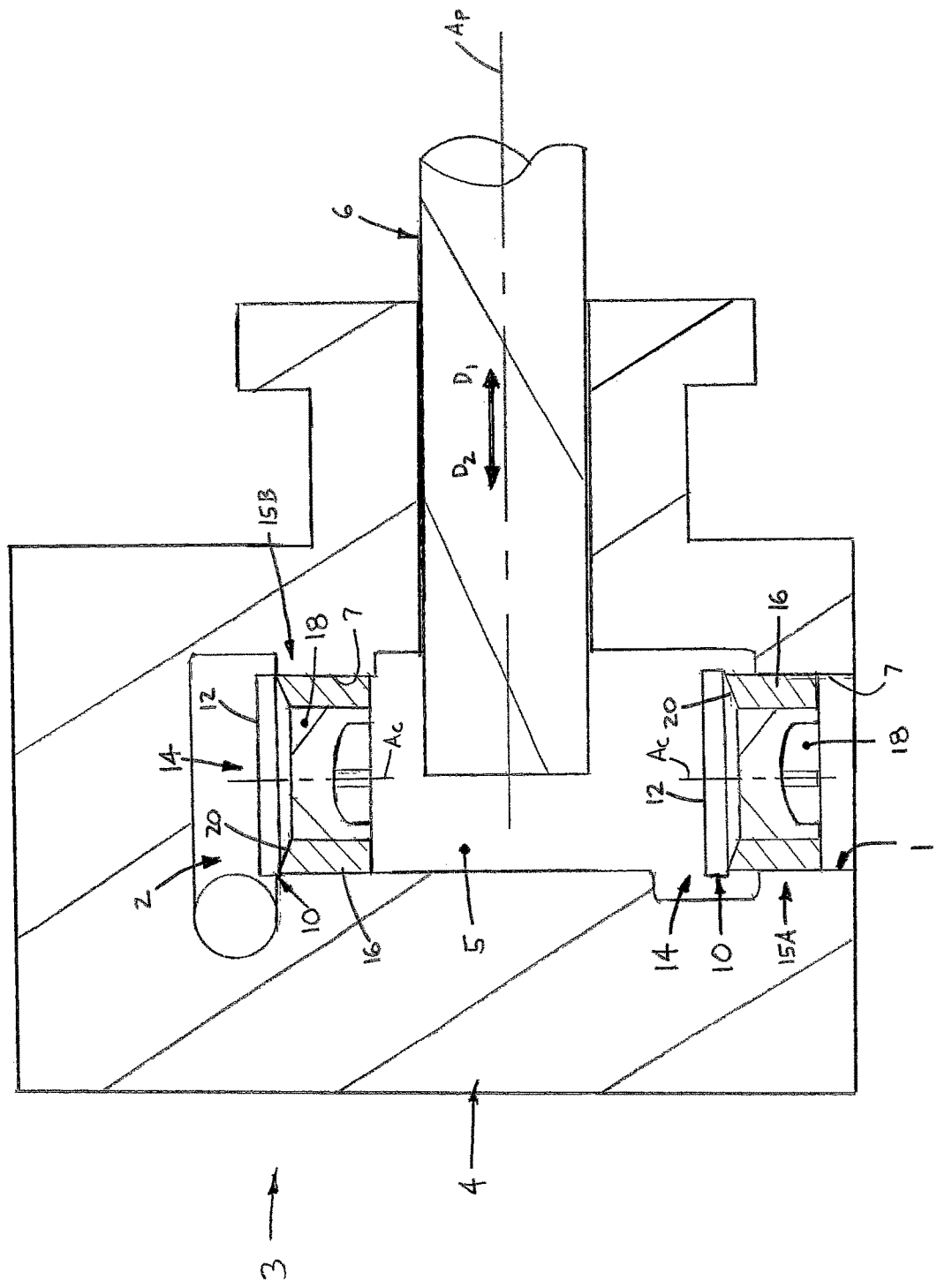
FIG. 1 is a cross-sectional view of a simplified linear pump having two valve assemblies, each including a seal assembly in accordance with the present invention.

Referring now to the drawings in detail, wherein like numbers are used to indicate like elements throughout, there is shown in FIGS. 1-11 a seal assembly 10 for a closure element 12 of a valve assembly 14. The valve assembly 14 further includes a valve seat body 16 with a flow passage 18 and a generally annular seat 20 extending circumferentially about an outlet end 18a of the passage 18. The valve assembly 14 is preferably used to control flow through either an inlet 1 or an outlet 2 of a linear pump 3, as shown in FIG. 1, but may be used in any other appropriate application. The closure element 12 is linearly displaceable along a central axis $A_C$ and includes a generally cylindrical disk-like body 22 with a centerline $L_{CC}$ generally coaxial with the central axis $A_C$. The closure element body 22 has a first axial end 22a disposeable against the seat 20 to interrupt flow from the passage 18, a second opposing axial end 22a, an outer circumferential surface 24 extending generally axially between the ends 22a, 22b, and a shoulder 26 extending radially outwardly from the outer surface 24 adjacent to the second end 22b. The seal assembly 10 basically comprises an outer seal 30 and an inner connector 40 disposed within the seal 30 and configured to couple the seal 30 with the closure element 12.

Figure 11A:
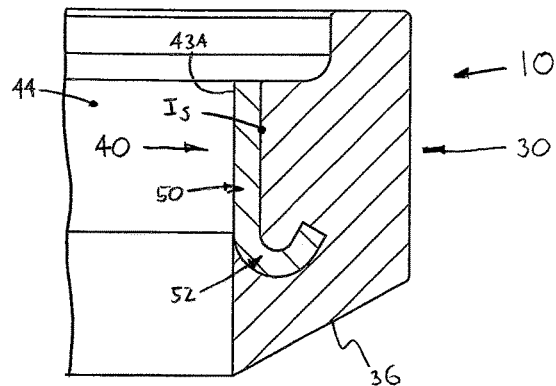
FIGS. 11A-11H, collectively
Figure 11B:
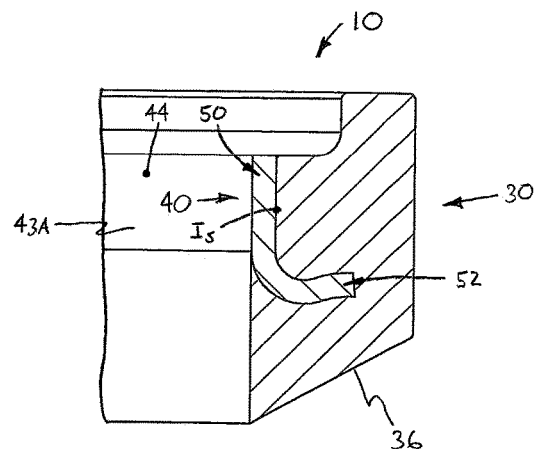
Figure 11C:
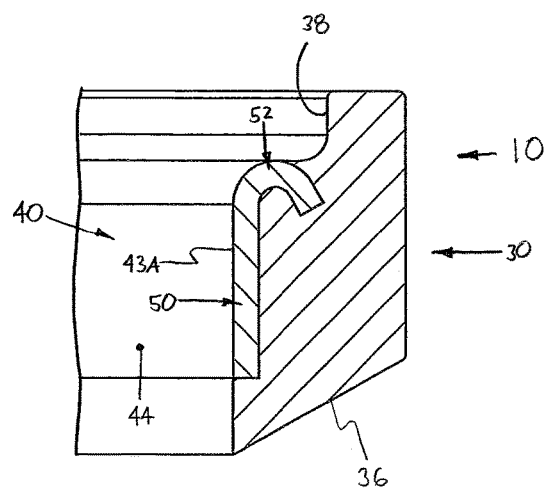
Figure 11D:
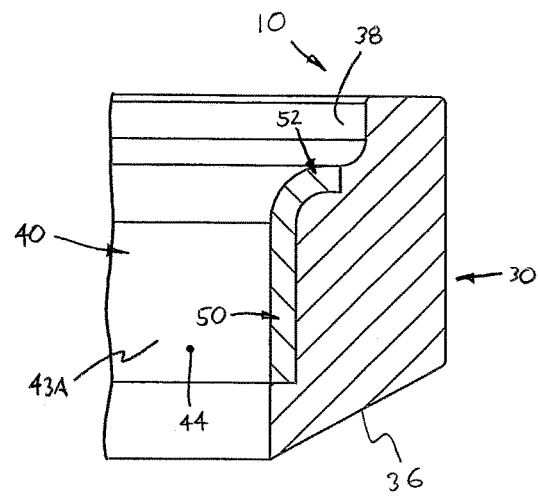
Figure 11E:
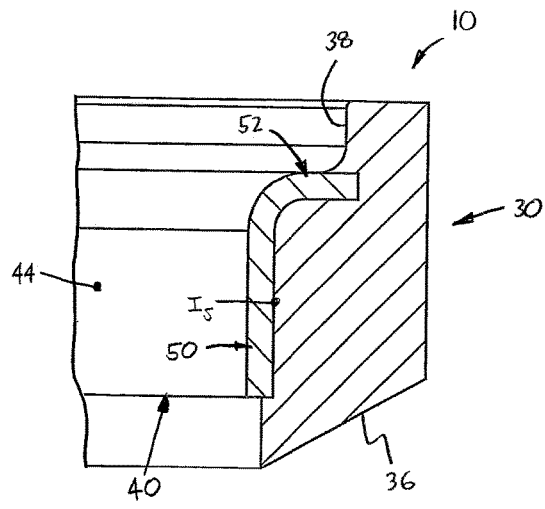
Figure 11F:
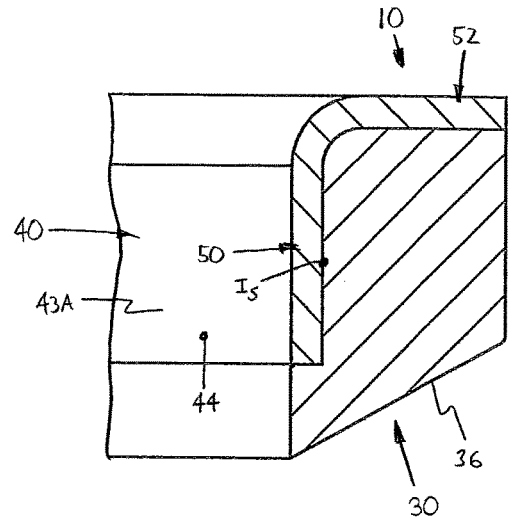
Figure 11G:
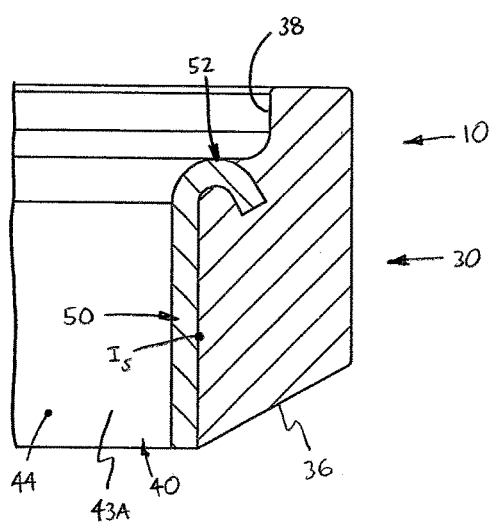
Figure 11H:
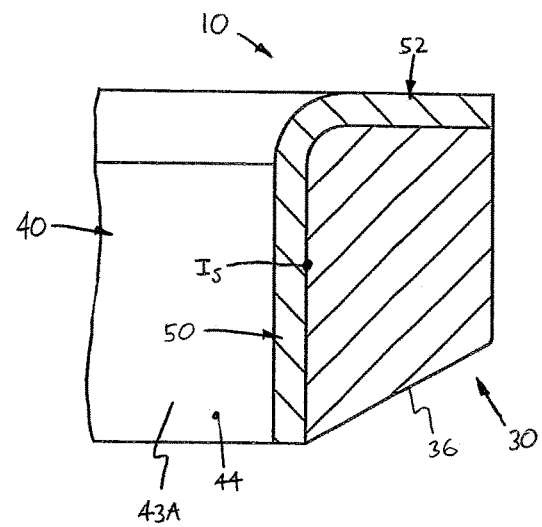

More specifically, the seal 30 includes a generally annular body 32, preferably a relatively thick, hollow circular cylinder, formed of a polymeric material $M_1$, preferably polyurethane or other plastic polymer, but may be any other appropriate seal material, such as Nitrile, Delrin, natural or synthetic rubber, etc. The seal body 32 has a centerline $L_{CS}$, an inner circumferential surface 33A defining a seal bore 34 (FIG. 9), an outer circumferential surface 33B, a radial thickness $t_S$ (FIG. 9) between the surfaces 33A, 33B, and opposing first and second axial ends 32a, 32b. The seal body first axial end 32a has a generally radially-extending, annular sealing surface 36 sealingly engageable with the valve seat 20. As such, the seal 30 functions to substantially prevent fluids from leaking past the interface $I_C$ (FIG. 2A) between the closure element 12 and the valve seat 20. Preferably, the seal body 32 further has a counterbore 38 extending axially inwardly from the body second axial end 32b and radially outwardly from the bore 34. The counterbore 38 is configured to receive the radial shoulder 26 of the closure element 12 to assist in retaining the seal body 32 disposed about the closure element 12. However, the seal body 32 may be formed without a counterbore, for example when used with a connector 40 having an extended radial flange portion 52 (described below), as shown in FIGS. 11F and 11H.

Further, the connector 40 includes a generally annular body 42 disposed at least partially within the seal bore 34 and formed of a substantially rigid material $M_2$, preferably a metallic material such as low carbon steel or aluminum, but may a rigid polymer, a ceramic or any other appropriate material. The connector body 42 has an inner circumferential surface 43A defining a bore 44, an outer circumferential surface 43B, a radial thickness $t_C$ (FIG. 8) between the surfaces 43A, 43B, and opposing first and second axial ends 42a, 42b, respectively. The connector body 42 is preferably formed as a relatively thin circular tube, such that the seal body thickness $t_S$ is substantially greater than the connector body radial thickness $t_C$. Further, the seal body 32 is preferably attached to the connector body 42 by adhesive bonding, most preferably by molding using a bonding substrate applied at an interface $I_S$ between the seal 30 and the connector 40, but may be attached by any other appropriate means (e.g., fasteners) or even merely retained by friction.

The connector body inner circumferential surface 43A is frictionally engageable with the closure element outer circumferential surface 24 to couple the seal 30 with the closure element 12. Specifically, the closure element 12 is inserted into the connector bore 44 (see FIG. 10) such that the closure element outer surface 24 slidably displaces against the connector inner surface 43A until the seal assembly 10 is fully "seated" about the closure element 12, as best shown in FIGS. 3-6. Specifically, when fully seated, the second axial end 42b of the connector 40 is preferably disposed against the closure element shoulder 26, the entire connector inner surface 43A is disposed about the closure element outer surface 24 and the sealing surface 36 of the seal 30 is generally aligned with a closure element engagement surface 23 (described below), as best shown in FIG. 9.

Preferably, the inner diameter $ID_{CO}$ (FIG. 8) of the connector inner surface 43A is sized slightly lesser than the outside diameter $OD_{CL}$ (FIG. 3) of the outer surface 24 of the closure element body 22, such that the connector 40 engages the closure element 12 with an interference fit or friction fit. Thereby, the seal assembly 10 is removably coupled with the closure element 12; specifically, the seal assembly 10 may be removed by slidably displacing the connector inner surface 43A against the closure body outer surface 24 until the seal assembly 10 is separated from the closure element 12. Further, the amount of force $F_M$ necessary to mount, and alternatively demount, the seal assembly 10 from the closure element 12 is directly proportional to the difference between the inside diameter $ID_{CO}$ of the connector 40 and the outside diameter $OD_{CL}$ of the closure element 12.

Referring to FIGS. 6-8 and 11, the connector 40 is preferably formed so as to include an axially extending, generally tubular base portion 50 and a generally radial flange portion 52. The tubular base portion 50 has an inner surface 51A providing the connector inner circumferential surface 43A, an opposing outer circumferential surface 51B providing the connector outer surface 43B, and two opposing axial ends 50a, 50b. The base portion 50 preferably has an axial length $L_A$ (FIG. 8) about equal to the axial length of the closure element outer surface 24, as shown in FIGS. 6-1, 11G and 11H. However, the tubular base portion 50 may be sized with an axial length $L_A$ substantially lesser than the closure element outer surface 24, as depicted in FIGS. 11A-11F. Further, the radial flange portion 52 has an inner radial end 52a integrally formed with and extending radially outwardly from one of the base portion axial ends 50a, 50b, depending on the desired construction as shown in FIGS. 6-8 and 11.

More specifically, in certain constructions shown in FIGS. 6-8, 11C-11H, the flange portion 52 extends outwardly from the first axial end 50a of the base portion 50 and is disposeable at least partially against a preferred shoulder 26 of the closure element body 20. In other constructions shown in FIGS. 11A and 11B, the flange portion 52 extends outwardly from the base portion second axial end 50b and is disposeable within, or "embedded" within, the seal body 32. Preferably, the flange portion 52 is sized having a radial extent $E_R$, i.e., the radial length or greatest distance from the flange inner end 52a, that is at least approximately equal to a radial length $L_R$ of the closure element shoulder 26.

Figure 10:
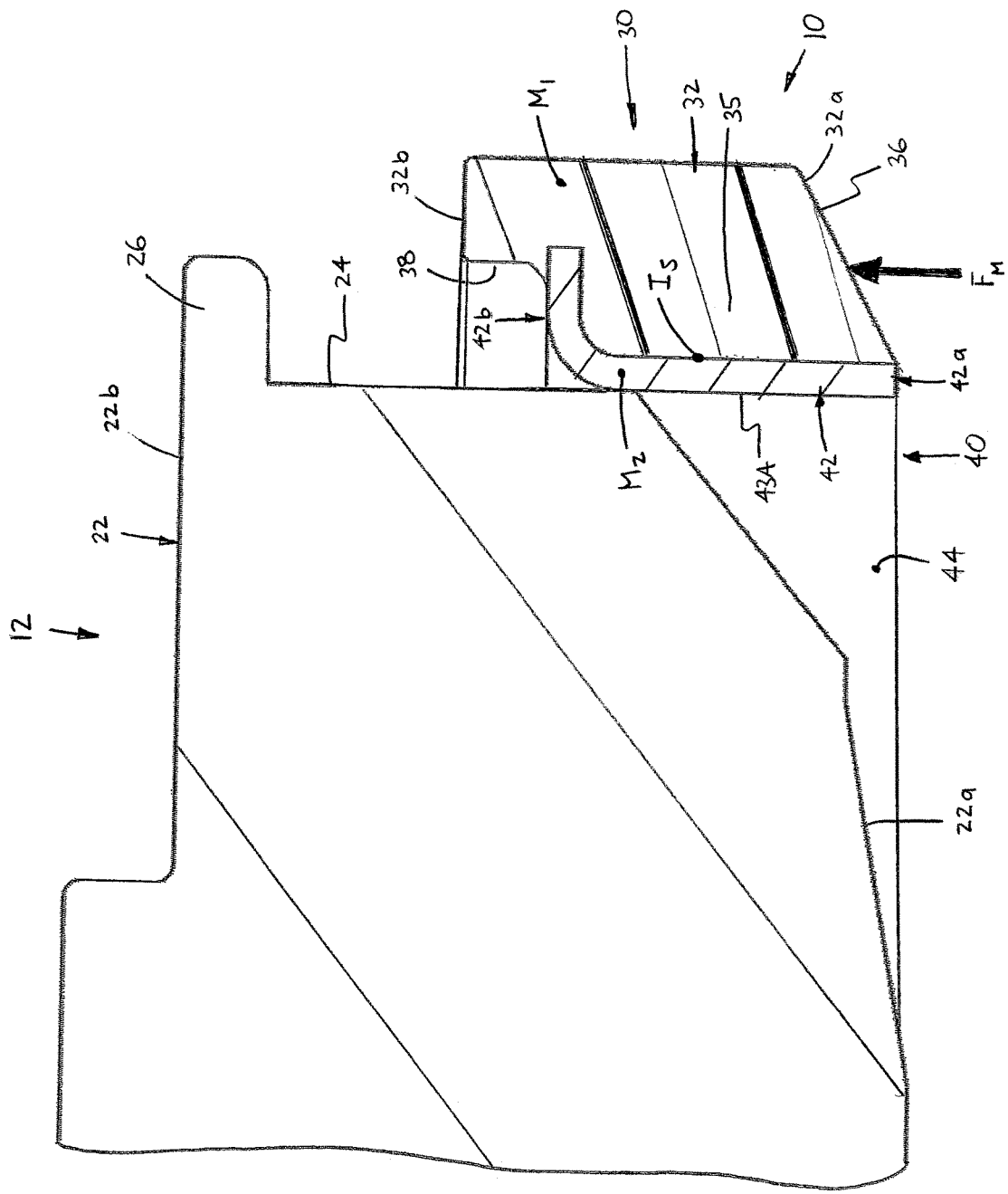
FIG. 10 is an enlarged, broken-away cross-sectional view of the closure element and the seal assembly, shown during installation of the seal assembly on the closure element.

Furthermore, in all of the various constructions, the connector flange portion 52 functions to retain the seal body 32 coupled with the connector body 42. Specifically, during installation of the seal assembly 10 about the closure element 12 as depicted in FIG. 10, the force $F_M$ applied to the seal body 32 to mount the connector 40 about the closure element 12 may fracture the bond at the connector interface $I_S$ and allow relative displacement between the seal 30 and the connector 40. The connector flange portion 52 is therefore provided to reinforce the portion 35 (FIGS. 6 and 10) of the seal body 32 between the body first axial end 32a, at which the mounting force $F_M$ is applied, and the flange portion 52. Thereby, displacement of the seal body 32 with respect to the connector body 40 is prevented.

Figure 2A:
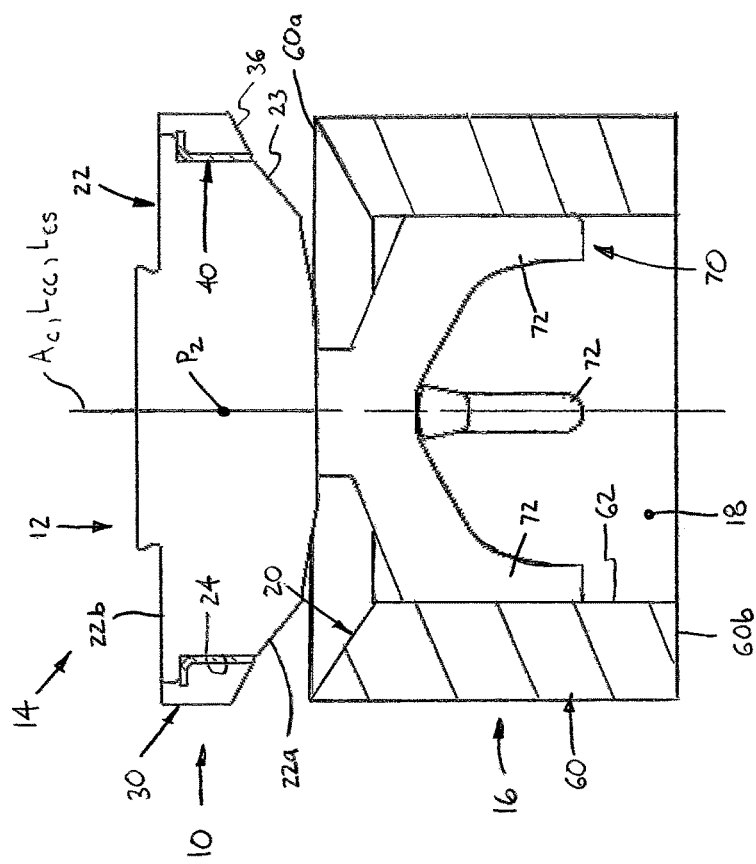
FIGS. 2A and 2B, collectively
Figure 2B:
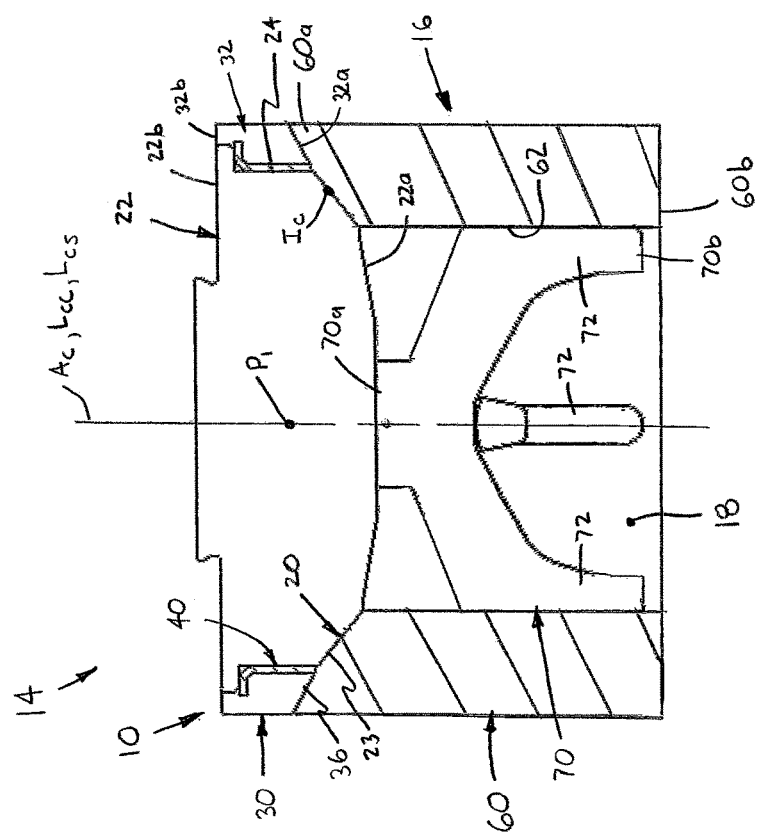
Figure 3:
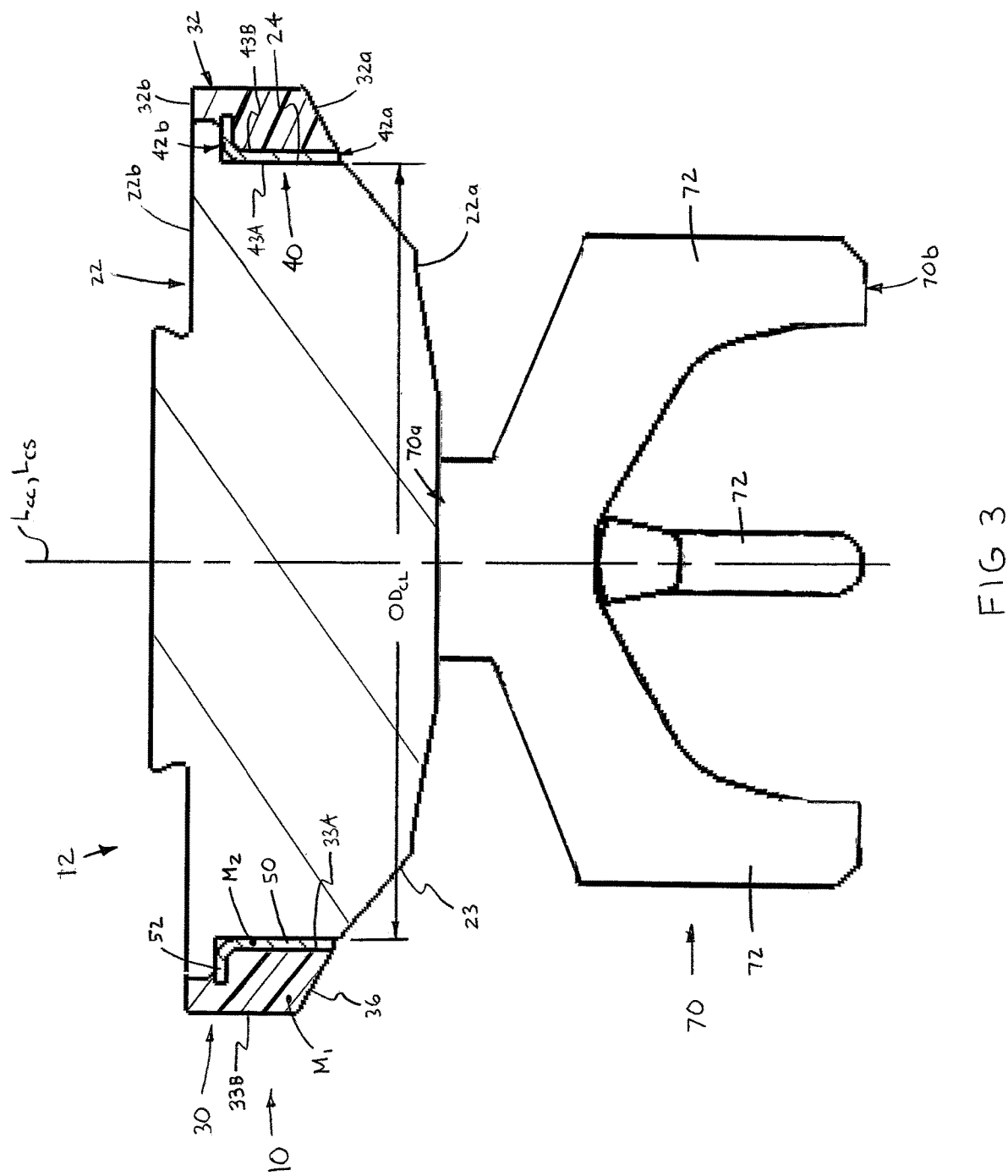
FIG. 3 is an enlarged cross-sectional view of a valve closure element with the seal assembly and an attached valve stem.
Figure 4:
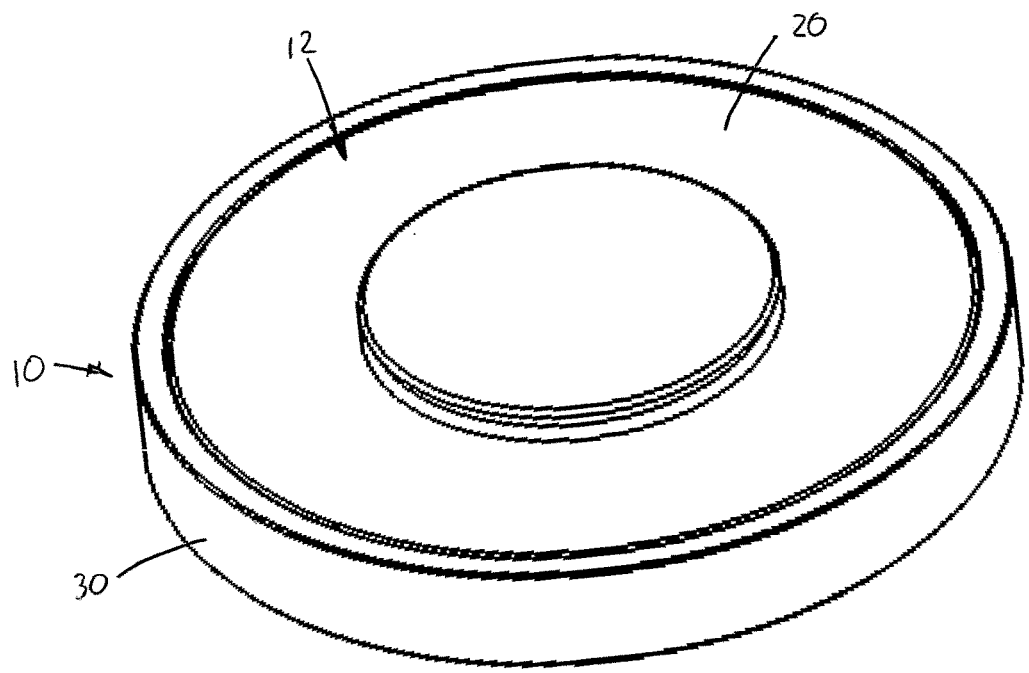
FIG. 4 is perspective view of the closure element and seal assembly.
Figure 5:
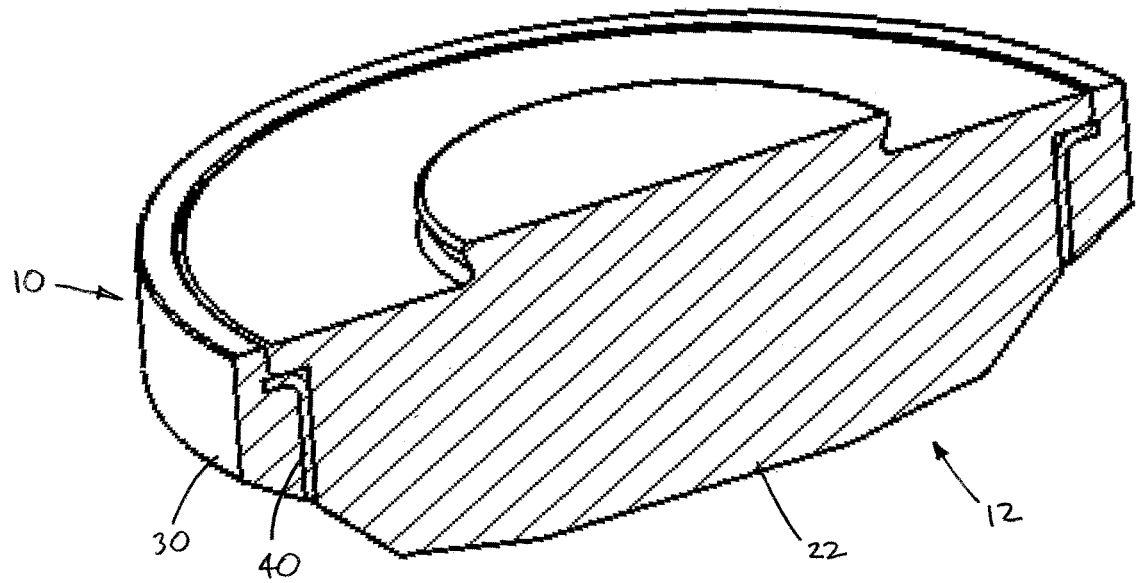
FIG. 5 is a cross-sectional view in perspective of the closure element and seal assembly.
Figure 6:
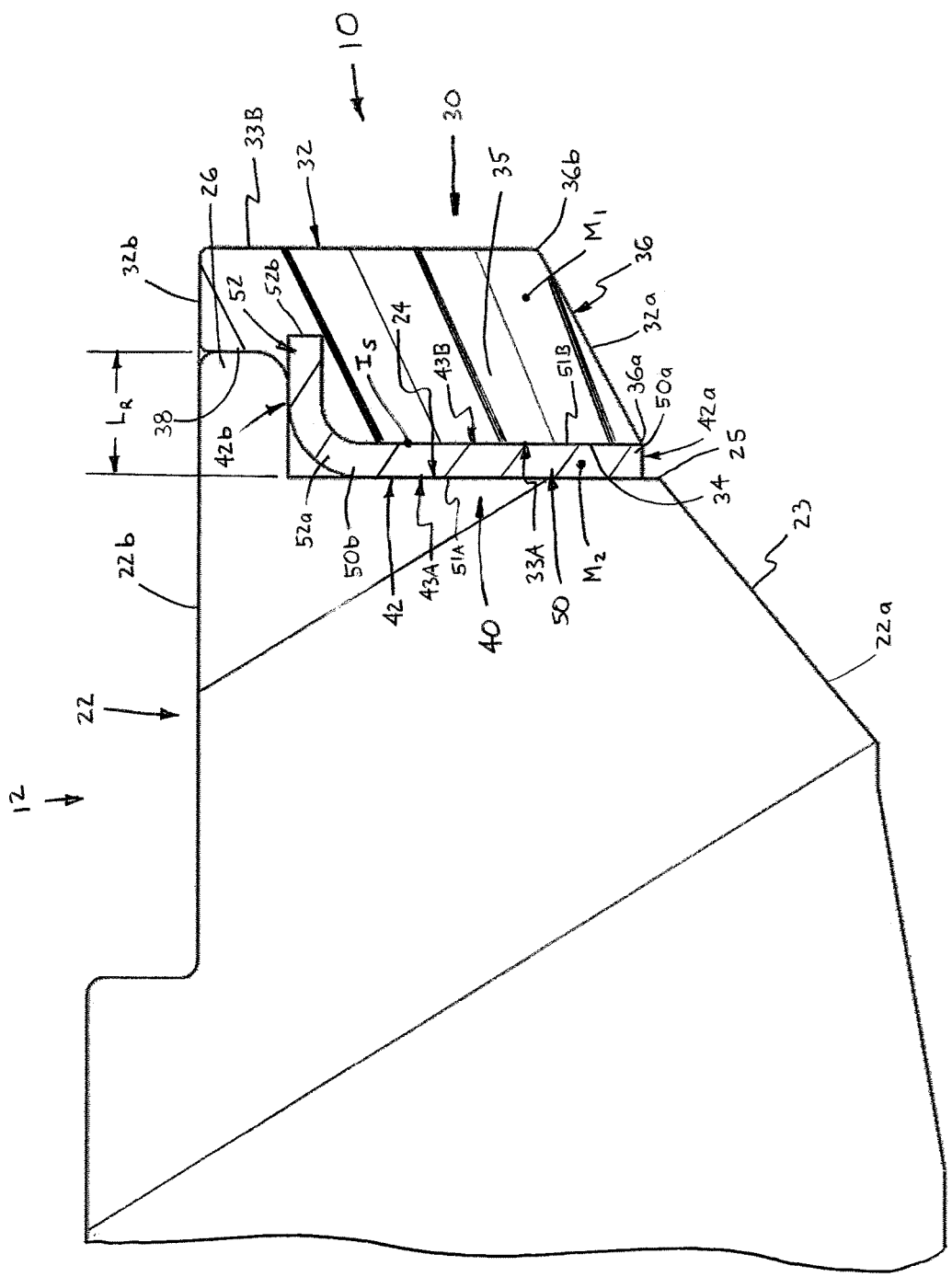
FIG. 6 is an enlarged, broken-away cross-sectional view of the closure element and seal assembly.
Figure 7:
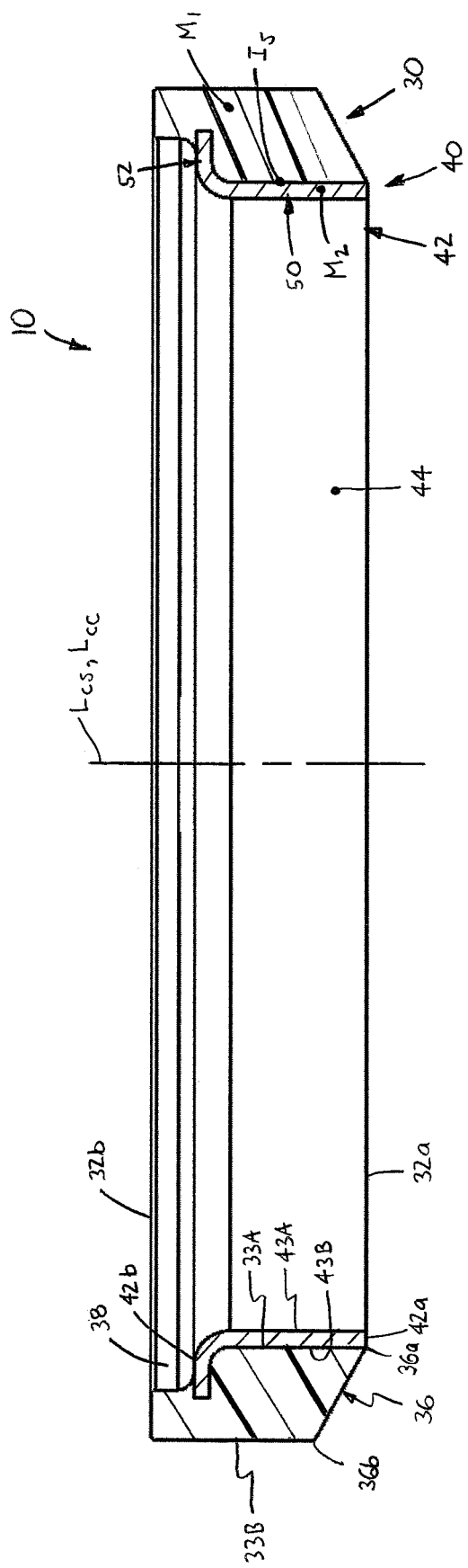
FIG. 7 is cross-sectional view of the seal assembly.

Referring to FIGS. 1-3, in a presently preferred application as discussed above, the valve assembly 14 is preferably utilized as a pair of first and second valve assemblies 15A, 15B of a linear pump 3, the first valve assembly 15A being disposed within the pump inlet 1 and the second valve assembly 15B being disposed within the outlet 2. The pump 3 further includes a housing 4, which provides the inlet 1 and the outlet 2 and an interior chamber 5, and a reciprocating piston 6 extending into housing 4 and disposed at least partially within the chamber 5. The piston 6 displaces in a first direction $D_1$ along an axis $A_P$ to draw fluid through the first valve assembly 15A and into the chamber 5, and alternately displaces in a second direction $D_2$ along the axis $A_P$ to pressurize fluid in the chamber 5 and then discharge the pressurized fluid through the second valve assembly 15B.

In this preferred application, each valve seat body 16 preferably includes a generally hollow circular cylinder 60 having opposing first and second axial ends 60a, 60b, the valve seat 20 being provided on the first axial end 60a. The valve body has an inner circumferential surface 62 extending between the ends 60a, 60b and defining the valve passage 18. Preferably, circumferential valve seat 20 is concave or generally angled so as extend both radially outwardly from and axially along the central axis $A_C$, as best shown in FIG. 2B. Further, valve body cylinder 60 is disposed within a separate one of two circular bores 7 in the housing 3, each providing at least a portion the pump inlet 1 or the pump outlet 2.

With the above structure of the valve seat body 16, the first axial end 22a of the closure element body 22 preferably has a convex, angled annular engagement surface 23 disposeable against the valve seat 20 so that the closure element 12 disrupts flow through the valve passage 18, as described in further detail below. The engagement surface 23 extends radially outwardly from the centerline $L_{CC}$ and generally axially toward the second axial end 22b. Further, the valve assembly 14 also preferably includes a guide stem 70 having a first end 70a attached to the closure element 12 and a second end 70b disposed within the valve passage 18. The stem 70 preferably includes a plurality of axially-extending legs or fins 72 each slidably engageable with the valve body inner surface 62 so as to center the closure element 12 on the central axis $A_C$ during opening and closing of the valve assembly 14, as described below.

Further, the sealing surface 36 of the seal body 32 is preferably also generally angled to basically match the profile of the closure element engagement surface 23 as described above. Specifically, the sealing surface 36 extends axially and radially with respect to the seal body centerline $L_{CS}$. As such, a radially-inner edge 36a of the sealing surface 36 is generally adjacent to an outer edge 25 (FIG. 6) of the closure element first axial end 22a and a radially-outer edge 36b of the sealing surface 36 is spaced axially toward the second axial end 22a of the closure element 12. Preferably, the sealing surface 36 is "shallower" or less steeply angled than the closure element engagement surface 23 such that a least a portion of the seal body 32 at the body first axial end 32a is compressed against the valve seat 20 when the closure element 12 is at a closed position $P_1$ described below.

Referring to FIGS. 1 and 2, in use, the closure element 12 is displaceable between first and second positions $P_1$, $P_2$ along the valve central axis $A_C$. In the first, "closed" position $P_1$ as shown in FIGS. 1 and 2A, the closure element first axial end 22a is disposed against the valve seat 20 so as to at least substantially disrupt fluid flow through the associated passage 18. In the closed position $P_1$, the seal 30 at least substantially prevents any leakage of fluid within the valve passage through the valve interface $I_C$. Alternatively, in the second, "open" position $P_2$ depicted in FIG. 2B, the closure element first axial end 22a is spaced from the valve seat 20 to permit flow through the valve passage 18 and either into or out of the housing chamber 5.

The seal assembly 10 of the present invention is advantageous for two main reasons. By having a rigid connector 40, which is preferably metallic, for coupling the seal 30 with the closure element 12, the seal assembly 10 is more positively retained and less likely to fail in comparison with previously known seals retained by interference between a relatively soft seal with a metallic closure element. More significantly, by having the seal assembly 10 fabricated separately from the closure element 12, and then attached to the closure element 12 by a separate installation process, the seal assembly 10 is much easier to fabricate in comparison with prior seals that had to be injected molded about, or directly bonded to, a closure element. The present seal assembly 10 can be shipped to an end user for direct installation of the seal assembly 10 and does not require the closure element 12, which can be relatively large and heavy, to be shipped back to the seal manufacturer for replacement.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as generally defined in the appended claims.

I claim:

1. A seal assembly for a closure element of a valve assembly including a valve body with a flow passage and an annular seat extending about the flow passage, the closure element being linearly displaceable along a central axis and including a cylindrical body having an outer circumferential surface, a first axial end disposeable against the annular seat to interrupt flow from the flow passage and a second opposing axial end, the seal assembly comprising:
   an outer seal including an annular body formed of a polymeric material and having a centerline, an inner circumferential surface defining a seal bore, an outer circumferential surface, and opposing first and second axial ends, the first axial end of the outer seal having a radially-extending, annular sealing surface sealingly engageable with the annular seat; and
   an inner connector including an annular body formed of a rigid material and disposed at least partially within the seal bore, the inner connector body having an inner circumferential surface with an inside diameter sized lesser than an outside diameter of the outer circumferential surface of the closure element body such that the inner connector body inner circumferential surface is frictionally engageable with the closure element body outer circumferential surface to couple the outer seal with the closure element by an interference fit, the inside diameter of the inner connector body inner circumferential surface being constant along the entire axial length of engagement with the closure element body outer circumferential surface.

2. The seal assembly as recited in claim 1 wherein the inner connector includes:
   a tubular base portion having an inner surface providing the inner connector inner circumferential surface, an opposing outer circumferential surface and two opposing axial ends, at least a section of the outer seal body inner circumferential surface being disposed about the tubular base portion outer circumferential surface; and
   a flange portion integrally formed with and extending radially outwardly from one of the base portion axial ends, the flange portion being disposed against or within the outer seal annular body.

3. The seal assembly as recited in claim 1 wherein the outer seal body is formed of polyurethane or another plastic polymer and the inner connector is formed of a metallic material.

4. The seal assembly as recited in claim 1 wherein the annular sealing surface of the outer seal annular body is angled so as to extend axially and radially with respect to the seal body centerline such that when the seal assembly is mounted on the closure element, a radially-inner edge of the annular sealing surface is adjacent to an outer edge of the closure element first axial end and a radially-outer edge of the angled surface is spaced axially toward the second axial end of the closure element.

5. The seal assembly as recited in claim 1 wherein the outer seal annular body further has a counterbore extending axially inwardly from the seal body second axial end and radially outwardly from the seal bore, the counterbore being configured to receive a radial shoulder of the closure element.

6. The seal assembly as recited in claim 1 wherein the outer seal annular body has a radial thickness between the outer seal annular body inner and outer circumferential surfaces, the inner connector body has a radial thickness between the inner connector body inner and outer circumferential surfaces and the outer seal annular body thickness is greater than the inner connector body radial thickness.

7. The seal assembly as recited in claim 1 wherein the seal assembly is removable from the valve closure element by slidably displacing the inner connector inner circumferential surface against the closure element cylindrical body outer circumferential surface until the seal assembly is separated from the closure element.

8. A valve assembly comprising:
a valve body having a central flow passage and an annular valve seat extending circumferentially about the central flow passage;
a closure element linearly displaceable along a central axis and including a cylindrical body having an outer circumferential surface, a first axial end disposeable against the annular valve seat to interrupt flow from the central flow passage and a second opposing axial end; and
a seal assembly including:
an outer seal including an annular body formed of a polymeric material and having a centerline, an inner circumferential surface defining a seal bore, an outer circumferential surface, and opposing first and second axial ends, the first axial end of the outer seal having a radially-extending, annular sealing surface sealingly engageable with the annular valve seat; and
an inner connector including an annular body formed of a rigid material and disposed at least partially within the seal bore, the inner connector annular body having an inner circumferential surface with an inside diameter sized lesser than an outside diameter of the outer circumferential surface of the closure element body such that the inner connector annular body inner circumferential surface is frictionally engageable with the closure element cylindrical body outer circumferential surface to couple the outer seal with the closure element by an interference fit, the inside diameter of the inner connector annular body inner circumferential surface being constant along the entire axial length of engagement with the closure element cylindrical body outer circumferential surface.

9. The valve assembly as recited in claim 8 wherein the closure element is displaceable along the central axis between a first position at which the closure element first axial end is disposed against the annular valve seat and a second position at which the closure element first axial end is spaced from the annular valve seat.

10. The valve assembly as recited in claim 8 wherein the inner connector includes:
a tubular base portion having an inner surface providing the inner connector inner circumferential surface, an opposing outer circumferential surface and two opposing axial ends, at least a section of the outer seal annular body inner circumferential surface being disposed about the tubular base portion outer circumferential surface; and
a flange portion integrally formed with and extending radially outwardly from one of the base portion axial ends, the flange portion being disposed against or within the outer seal annular body.

11. The valve assembly as recited in claim 8 wherein the outer seal annular body is formed of polyurethane or another plastic polymer and the inner connector is formed of a metallic material.

12. The valve assembly as recited in claim 8 wherein the annular sealing surface of the outer seal annular body is angled so as to extend axially and radially with respect to the seal body centerline such that a radially-inner edge of the annular sealing surface is adjacent to an outer edge of the closure element first axial end and a radially-outer edge of the angled surface is spaced axially toward the second axial end of the closure element.

13. The valve assembly as recited in claim 8 wherein the outer seal annular body further has a counterbore extending axially inwardly from the outer seal annular body second axial end and radially outwardly from the seal bore, the counterbore being configured to receive a radial shoulder of the closure element.

14. The valve assembly as recited in claim 9 wherein the outer seal annular body has a radial thickness between the outer seal annular body inner and outer circumferential surfaces, the inner connector annular body has a radial thickness between the inner connector annular body inner and outer circumferential surfaces and the outer seal annular body thickness is greater than the inner connector annular body radial thickness.

15. The valve assembly as recited in claim 8 wherein the seal assembly is removable from the valve closure element by slidably displacing the inner connector inner circumferential surface against the closure element cylindrical body outer circumferential surface until the seal assembly is separated from the closure element.

* * * * *